United States Patent
Tapster et al.

(10) Patent No.: US 8,768,992 B2
(45) Date of Patent: Jul. 1, 2014

(54) APPARATUS AND METHOD FOR GENERATING RANDOM NUMBERS

(75) Inventors: Paul Richard Tapster, Worcestershire (GB); Philip Michael Gorman, Worcestershire (GB)

(73) Assignee: Qinetiq Limited (GB)

( * ) Notice: Subject to any disclaimer, the term of this patent is extended or adjusted under 35 U.S.C. 154(b) by 1674 days.

(21) Appl. No.: 12/280,219

(22) PCT Filed: Feb. 19, 2007

(86) PCT No.: PCT/GB2007/000580
§ 371 (c)(1),
(2), (4) Date: Aug. 21, 2008

(87) PCT Pub. No.: WO2007/096598
PCT Pub. Date: Aug. 30, 2007

(65) Prior Publication Data
US 2009/0013019 A1    Jan. 8, 2009

(30) Foreign Application Priority Data
Feb. 22, 2006  (GB) .................................. 0603523.2

(51) Int. Cl.
*G06F 7/58* (2006.01)
(52) U.S. Cl.
USPC .......................................... 708/250; 708/253
(58) Field of Classification Search
None
See application file for complete search history.

(56) References Cited

U.S. PATENT DOCUMENTS

| 5,224,165 A | 6/1993 | Reinhardt et al. |
| 5,696,828 A | 12/1997 | Koopman, Jr. |
| 5,830,064 A | 11/1998 | Bradish et al. |
| 5,961,577 A * | 10/1999 | Soenen et al. ................. 708/251 |
| 6,188,294 B1 * | 2/2001 | Ryan et al. ..................... 708/250 |
| 6,195,669 B1 * | 2/2001 | Onodera et al. ................... 708/3 |
| 6,324,558 B1 | 11/2001 | Wilbur |
| 6,369,727 B1 | 4/2002 | Vincze |
| 7,007,060 B2 * | 2/2006 | Miller, Jr. ..................... 708/801 |
| 7,124,157 B2 | 10/2006 | Ikake |
| 7,511,586 B2 * | 3/2009 | Mattisson ........................ 331/78 |
| 7,583,155 B2 * | 9/2009 | Mattisson ........................ 331/78 |
| 2005/0038840 A1 * | 2/2005 | Miller, Jr. ..................... 708/250 |
| 2007/0180009 A1 * | 8/2007 | Gutnik .......................... 708/250 |
| 2008/0279370 A1 * | 11/2008 | Hatakeyama ................... 380/30 |

FOREIGN PATENT DOCUMENTS

| EP | 1 241 565 | 9/2002 |
| EP | 1 422 613 | 5/2004 |
| EP | 1 544 726 | 6/2005 |
| EP | 1 577 749 | 9/2005 |
| JP | 11-85472 | 3/1999 |
| JP | 11-136047 | 5/1999 |
| WO | WO 00/70742 | 11/2000 |

* cited by examiner

*Primary Examiner* — Lewis A Bullock, Jr.
*Assistant Examiner* — Christine Dang
(74) *Attorney, Agent, or Firm* — McDonnell Boehnen Hulbert & Berghoff LLP

(57) ABSTRACT

Random number generation apparatus (2) is described that comprises a threshold detector (4) and an electrical noise generator (6). The electrical noise generator (6) has at least two channels (8a-8d) and each channel is arranged to generate an electrical noise signal. The threshold detector (4), which may comprise a digital input-output (DIO) card, is arranged to periodically compare this electrical noise signal with a threshold and to provide a binary data output that indicates whether the threshold has been exceeded. Each channel of the electrical noise generator comprises at least two amplifiers (10a-10c) electrically connected in series that preferably provide a gain of 50,000 or more. Use of the random number generation apparatus (2) for quantum cryptography applications is also described.

16 Claims, 3 Drawing Sheets

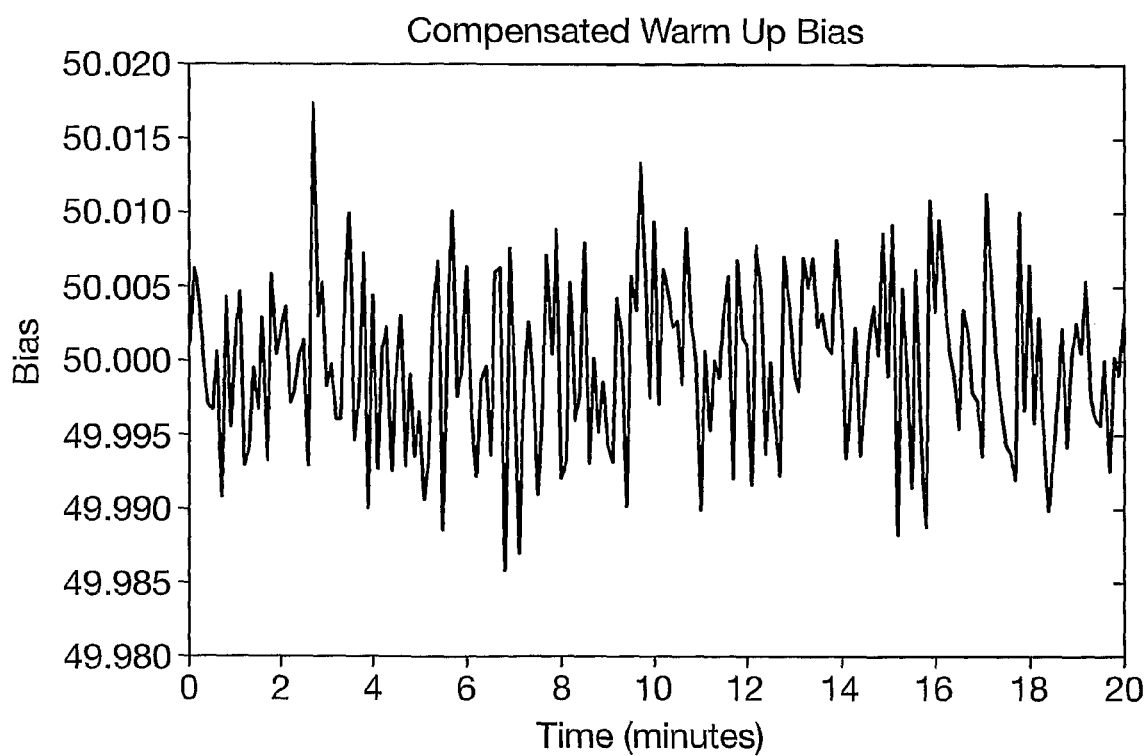

APPARATUS AND METHOD FOR GENERATING RANDOM NUMBERS

BACKGROUND OF THE INVENTION (1) Field of the Invention

The present invention relates to random number generation and in particular to an improved method and apparatus for generating random numbers.

(2) Description of the Art

Random number generation plays a vital role in a wide variety of applications; for example cryptography, numerical simulation and gaming applications. In the field of cryptography, keys are formed using a stream of random numbers and failure to supply numbers that are sufficiently random can seriously compromise the security of the cryptographic system. Furthermore, the most secure cryptographic techniques require random numbers to be supplied at a very high bit rate. For example, in the case of a One Time Pad (OTP) encryption scheme, the number of random bits required is equal to the number of bits of information to be encrypted.

Many different types of random number generator (RNG) have thus been developed over the years to meet the quality (i.e. randomness) and bit rate requirements of the above applications. For example, it is known to use quantum phenomena to provide inherently random number generation. Devices based on the radioactive decay of elements and the randomness associated with the path traveled by single photons of light passing through a beam splitter have thus been developed. Although such devices offer truly random number generation, the associated complexity makes high bit rate, low cost, devices impractical.

Random number generators based on a variety of electrical techniques are also known. However, such devices are typically used in applications where low levels of randomness are acceptable. Two typical examples of electrical RNGs are described in U.S. Pat. No. 5,224,165 and U.S. Pat. No. 6,369,727.

U.S. Pat. No. 5,224,165 describes a low cost random number generator having a plurality of channels in which noise is generated by a pair of diodes. The noise of the two diodes is fed to a comparator and converted into a stream of random binary data bits. A reference noise channel is also provided to output a stream of reference data bits. A exclusive-or (XOR) operation is performed on the random bits produced by each noise channel and the random bits provided by the reference noise channel. In this manner, the relatively low quality of the random binary data bits can be improved. However, the device of U.S. Pat. No. 5,224,165 falls short of both the bit rate and quality (i.e. level of randomness) required for cryptographic applications.

U.S. Pat. No. 6,369,727 describes an alternative RNG in which amplified electrical noise is passed to an analogue to digital converter (ADC). A normal distribution of digital words is output by the ADC and converted to a random number stream using a reductive mapping technique. The complexity of implementing the reductive mapping technique, and the limited speed of the ADC, means that the bit rate attainable from such a RNG is somewhat limited.

SUMMARY OF THE INVENTION

It is an object of the present invention to mitigate at least some of the above mentioned disadvantages associated with known random number generation devices and methods. It is a further object of the invention to provide a low cost RNG that produces high quality (i.e. highly random) data bits and/or has a high bit output rate. It is a further object of the present invention to provide a RNG for use in a cryptographic system.

According to the present invention, random number generation apparatus comprises a threshold detector and an electrical noise generator having at least two channels, each channel of the electrical noise generator being arranged to generate an electrical noise signal, wherein the threshold detector is arranged to periodically compare the electrical noise signal generated by each channel with a threshold and provide a binary data output indicative of whether said threshold has been exceeded, characterised in that each channel of the electrical noise generator comprises at least two amplifiers electrically connected in series.

A random number generator is thus provided comprising an electrical noise generator having two or more channels that each produce an electrical noise signal. The electrical noise signal generated by each channel is passed to a threshold detector (e.g. a DIO card) and periodically compared (e.g. at a sample rate of 10 MHz) to a predetermined threshold voltage level. The threshold detector produces a binary data output that comprises binary data bits (i.e. 0s and 1s) to indicate if, when sampled, the relevant threshold has been exceeded by the electrical noise signal. To provide a sufficiently high level of electrical noise, each channel of the electrical noise generator comprises at least two amplifiers electrically connected in series. The electrical noise provided by each channel of the electrical noise generator is essentially random and the threshold detector thus generates a binary data output comprising a stream of essentially random binary data bits. As described below, the apparatus of the present invention is also highly flexible because the number of channels can be readily increased to provide improved random number generation rates.

The use of a chain of two or more amplifiers connected in series to amplify thermal noise present at the input of the first amplifier improves the randomness of the random number output of the apparatus compared with the simple, low gain, system described in U.S. Pat. No. 5,224,165. Furthermore, the provision of an electrical noise generator comprising multiple channels for producing a plurality of electrical noise signals is advantageous when compared with devices of the type described in U.S. Pat. No. 6,369,727 in which an analogue-to-digital converter (ADC) is used to sample a single noise source. For example, the present invention does not require the complex reductive mapping techniques described in U.S. Pat. No. 6,369,727 that are performed on the output of the ADC. The present invention is thus cheaper and simpler to implement and inherently more reliable than ADC based devices.

Advantageously, each channel of the electrical noise generator comprises feedback reduction means to minimise feedback through the series of at least two amplifiers. An electrical arrangement in which feedback effects are minimised is preferred in order to reduce, or eliminate, oscillations within each channel of the electrical noise generator. Oscillations induced by feedback effects can introduce a periodicity into the electrical noise signal and thus reduce the randomness of the stream of numbers output by the threshold detector. It is thus preferred to have a non feed-back amplifier arrangement.

The feedback reduction means may comprise various electrical components and arrangements, some of which may have been applied previously in different technical fields. For example, at least one decoupling capacitor may be provided in parallel with the power supply of the amplifier to isolate each amplifier of the channel from any signals on the power rail. Furthermore, a separate power regulator could be provided for each amplifier of the electrical noise generator.

In addition, each amplifier of a channel may be located on a hybrid substrate that is physically separated from the hybrid substrates of adjacent amplifier(s) in the series. In other words, each amplifier may be mounted on a hybrid substrate that is, in turn, mounted on the main PCB. Conveniently cross-talk between the at least two channels is also minimised; for example, by locating each channel on a separate portion of the circuit board and providing separate power supplies for each channel.

Preferably, the at least two amplifiers of each channel of the electrical noise generator are arranged to provide an overall gain in the range of 50,000 to 150,000. Conveniently, the at least two amplifiers of each channel of the electrical noise generator are arranged to provide an overall gain of around 50,000 (e.g. ±10,000) or around 100,000 (e.g. ±10,000). A gain of more than 50,000, more than 100,000 and/or less than 150,000 is preferred.

Providing such a high level of gain ensures that the electrical noise signal has a sufficiently large voltage variation so that it randomly crosses the voltage threshold of the threshold detector. In other words, the minute noise levels present at the input to the first amplifier are amplified so as to provide an electrical noise signal that has a high noise to signal ratio. Although such high gain amplification is preferred, too high a gain would increase the feedback associated with the system. The provision of a gain within the range describe above thus provides a sufficiently amplified noise signal without introducing unwanted feedback effects.

Advantageously, each of the at least two amplifiers of each channel have a bandwidth within the range of 10 MHz to 100 MHz. For example, the bandwidth is preferably greater than 10 MHz and/or less than 100 MHz. Preferably, the bandwidth is greater than 40 MHz or 45 MHz and/or less than 60 MHz or 55 MHz. Conveniently, each of the at least two amplifiers of each channel have a bandwidth of around 50 MHz (e.g. ±5 MHz). The bandwidth of each amplifier in a channel, or in different channels, may be identical, similar or different as required.

Preferably, each channel comprises three amplifiers electrically connected in series. The provision of three amplifier chips, for example UA733 chips, has been found to offer sufficient amplification gain without the introduction of unwanted feedback effects.

Preferably each channel further comprises a gain shaping means to shape the gain response of the amplifier stage. A suitable gain shaping means would be an equalisation filter, especially a programmable equalisation filter. Ideally the gain response of the amplification stage should be flat over an extended frequency range, known as a maximally flat response, and an equalisation filter can aid in providing such a gain response.

Advantageously, the electrical noise generator comprises at least four channels. More preferably, the electrical noise generator comprises at least six, or eight or ten channels. The more channels that are provided, the greater the random number bit rates that can be achieved.

Conveniently, each channel comprises at least one bias control means, the at least one bias control means being connected to the input of one of said at least two amplifiers and arranged so as to provide control over the DC voltage level of the electrical noise signal output by the channel. The provision of such a bias control means enables the amplified noise signal (which is essentially a random variation) to be combined with a DC bias voltage. The electrical noise signal output by the channel can thus have a mean level equivalent to the DC bias voltage, but the voltage of the signal will vary around the mean level in a random manner. In other words, the amplified random noise signal is superimposed on a DC voltage. As described in more detail below, the DC level can thus be set to be substantially equal to the threshold level of the threshold detector. The amplified noise will then cause the electrical noise signal to cross the threshold level in a random manner.

It has been found that, under certain conditions, the threshold levels of a threshold detector (especially a DIO card of the type described in more detail below) can vary over time and/or with temperature. A drift compensation controller can thus be conveniently provided for adjusting the at least one bias control means (and hence the DC level) of each channel so as to maintain the bias of the binary data output of the threshold detector to within a predetermined range. Advantageously, the drift compensation controller may be arranged to maintain the bias associated with the binary data output of the threshold detector to within the range of 45% to 55% or more preferably to within the range of 49.5% to 50.5%. As would be well understood by a skilled person, the "bias" of a stream of binary data bits is the difference in the percentage of zeros and ones that are contained in that data stream. A truly random stream of binary data thus has a bias of 50%; i.e. half the output bits are zeros and half are ones. However for some applications it may be wished to alter the bias associated with, a particular channel to some other value. As will be described in more detail below there may be some applications where the various channels of the random number generator may be combined to make a multiple digit number. For instance to generate random numbers from 1 to 10 the output from four channels could be used to form a four digit binary number. Thus the combined output would be a binary number ranging from 0000 to 1111, i.e. from 0 to 16. To get the numbers 1-10 six of these possibilities would need to be discarded. Therefore the only numbers used would be 0000 to 1001 (0-9). It can be seen that out of the ten four-digit binary numbers the most significant bit is 0 in eight cases and 1 in only two cases. Thus, if each of the numbers 1-10 were required with equal probability the channel corresponding to the most significant bit should be biased to 80% in favour of producing a zero. The channel corresponding to the least significant bit would need to be biased to 50%. It can therefore be seen that allowing independent biased of each of a plurality of channels can allow any set of combined numbers to be output from the random number generator with a defined probability. Thus the random number generator of the present invention has application wider than the field of quantum cryptography.

The drift compensation controller may comprise a means of counting the instances of 1s and 0s output from each channel in a certain period and generating an imbalance control signal. For a statistically significant period the numbers of 1s and 0s should be equal for a bias of 50%. Any imbalance from the expected ratio of 1s and 0s for the required bias is noted and used to generate the imbalance control signal. Preferably the imbalance control signal is a digital number and the drift compensation controller comprises a digital to analogue converter for converting this number to a DC bias which is applied to the channel so as to maintain the correct bias.

It should be noted that the threshold detector may be arranged to compare each electrical noise signal to a common threshold level or each electrical noise signal may be compared to a separate threshold level.

Each channel may comprise a load resistor, the load resistor being connected to the input of the first amplifier of the series of at least two amplifiers. A resistor provides a thermal noise source; i.e. it is non-deterministic and the generated noise is truly random. A skilled person would recognise the various different types of resistors that could be used in such a system. A resistor having a resistance of around 50 ohms is preferred. It should be noted that although the load resistor is a good source of thermal noise its inclusion in the circuit is by no means essential. In practice, significantly more noise will be generated by the first amplifier of said at least two amplifiers than by the load resistor.

Preferably, the threshold detector produces a separate binary data output stream for each electrical noise signal. In other words, the threshold detector may process each electrical noise signal provided by the electrical noise generator in parallel. A threshold detector receiving N electrical noise signals would thus out N streams of binary random numbers. These binary random number streams may be routed to different applications, or the parallel streams may be combined to form multiple bit random words. Alternatively, the bits may be combined to produce a binary data stream having a higher bit rate.

Advantageously, the threshold detector comprises a digital input/output (DIO) card having a plurality of inputs, wherein the electrical noise signal generated by each channel of the electrical noise generator is provided to a separate input of the DIO card. The DIO card is preferably a commercially available item that can be interfaced to a standard personal computer; for example, a PCI7300A card would suffice. The card may have more inputs than are necessary; i.e. some inputs may be unused. Alternatively, two or more DIO cards may be provided to increase the number of electrical noise signals that can be sampled.

The threshold detector may comprise a plurality of threshold detector elements. For example, the threshold detector may comprise a plurality of discrete threshold detector units. Preferably, at least one threshold detector element may be provided per electrical noise signal. Alternatively, more than one threshold detector element may be provided per electrical noise signal.

Conveniently, the sample rate is greater than or substantially equal to 1 MHz, 5 MHz, 15 MHz, 25 MHz or 50 MHz. A faster sampling rate has the advantage of an improved random bit rate generation, but may suffer from increased short term correlations between adjacent data bits. Each electrical noise signal is thus preferably sampled by the threshold detector at a rate within the range of 5 MHz to 15 MHz. For example, each electrical noise signal may advantageously be sampled at a rate of around 10 MHz. It should be noted that the bit generation rate of an apparatus of the present invention can be readily increased by adding extra channels rather than using a DIO card having an increased sampling rate.

Advantageously, the apparatus further comprises a data processing module, the data processing module being configured to receive binary data output by the threshold detector and to perform a processing step on the received binary data to generate a processed binary data output having improved randomness characteristics, wherein said processing step comprises at least one exclusive OR (XOR) operation.

The processing module thus increases the randomness of the binary data supplied by the threshold detector and provides a processed binary data output having improved randomness. As described in more detail below, a convenient measure of the randomness of a stream of numbers is the Shannon entropy. The processing module can thus be seen to increase the Shannon entropy of the binary data output of the threshold detector using an XOR operation.

Although the basic principle of applying an XOR logic operation to improve the quality of a random data stream is known, such a technique has typically been applied in the prior art to adjacent data bits that are derived from a single pseudo-random noise source (e.g. a deterministic algorithm) or to data bits that are generated at the same point in time using different generation sources. In such arrangements, auto-correlation and cross-correlation between data pairs on which the XOR operation is performed can be present which will reduce the randomness of the data.

Conveniently, the data processing module is arranged to perform an XOR operation on pairs of binary data bits, wherein the data bits of each pair are derived by the threshold detector from the electrical noise signal of the same channel. Alternatively, the XOR operation may be performed using pairs of data bits created by the threshold detector from the electrical noise of different channels.

Preferably, each pair of binary data bits comprise data bits that are temporally separated by more than one thousand intervening data bits. More preferably, each pair of binary data bits comprise data bits that are temporally separated by more than ten thousand intervening data bits. More than one thousand, or ten thousand, data bits are thus generated by the threshold detector between the data bits that form the pair of binary data bits used in the XOR operation. In other words, the XOR operation is performed between every one or ten thousandth bit. This minimises autocorrelation effects between the data pairs used in the XOR operation.

The data processing module advantageously comprises at least one data buffer. The provision of at least one data buffer enables input and/or output data to be stored prior to being processed by, or output from, the data processing module. If the data processing module is implemented using software that is run on a computer, the at least one data buffer may be a reserved portion of the computer memory.

The data processing module may usefully comprise at least one input data buffer for every channel of the electrical noise generator, each input data buffer being arranged to receive the binary data output generated by the threshold detector from the electrical noise signal of the respective channel of the electrical noise generator. In this manner, every channel has an associated data buffer. The electrical noise signal produced by each channel is thus converted into a binary data stream by the threshold detector and only routed to the data buffer associated with that channel. In other words, random bit generation occurs in a parallel manner and the rate of bit generation can be readily increased by the addition of further channels.

Conveniently, each input data buffer is divided into at least first and second segments, each segment being fully loaded, in turn, with binary data bits, wherein said at least one XOR operation is performed on pairs of binary data bits, each pair of binary data bits comprising a data bit from the first segment and data bit from the second segment. Each segment may comprise a large number (e.g. 100, 500, 1000, 10000) of data bit locations. A first segment can then be loaded with, say, 1000 data bits before a second channel is loaded with 1000 data bits. Performing an XOR operation on the first data bits of the first and second segments can thus be seen to perform the XOR operation on data bits having 1000 intervening data bits. The use of such a buffering arrangement thus provides a convenient way of implementing the general XOR processing techniques described above.

Advantageously, each input data buffer may comprise at least first, second, third and fourth segments, wherein said at least one XOR operation is performed on data contained in the first and second segments whilst the third and fourth segments are being loaded with binary data. In other words, data that has been loaded into, say, the first and second segments can be processed whilst new data is being loaded into the third and fourth segments. Once the third and fourth segments are fully loaded, the XOR operation can be performed thereon whilst the first and second segments are reloaded. In this manner, the processing and data output is not delayed whilst segments are being loaded.

Alternatively, all the segments of an input data buffer may be loaded with data before the XOR operation is performed. If no additional buffering is provided this will result in the loss of data bits whilst the processing is being performed. However, this may be acceptable where random bits are required in short bursts (e.g. for cryptographic key generation), if a lower bit rate is required or where the electrical noise generator comprises multiple channels.

It should be noted that although a single XOR operation is often sufficient, two or more such operation could be performed on the data. A segment, or a separate data buffer, may then be provided to store interim XOR results.

The data processing module may further comprise an output data buffer. The use of an output data buffer enables the processed binary data to be output at the rate required by a host system (e.g. at the speed of a PC bus) or by a subsequent application (e.g. a cryptography system). The output buffer may, for example, allow a constant stream of random numbers to be provided as required without any breaks associated with loading segments of an input data buffer or performing processing steps etc. Alternatively, the output buffer may store the random number until output is requested by an associated application.

Preferably, the data processing module comprises a suitably programmed computer. For example, a computer program may implement the data processing module. Such a computer program may written so as to run on a suitable personal computer (PC). The computer may also comprise the DIO card. In this manner, the threshold detector and the processing module functions are performed by a single PC. The DIO card may be interfaced to the PC in a number of known way; for example, using the PCI bus or USB, SCSI connectors etc.

Instead of a software based implementation, the data processing module may advantageously comprise a suitably configured electronic circuit. For example, an field programmable gate array (FPGA) implementation may be provided with a microcontroller. This allows the processing to be performed without requiring the processing power of a host PC. In such a case, the data processing module may be interfaced to a PC in any one of a number of known ways (e.g. via the PCI bus or via USB connections etc) but will not require any significant use of the resources of the host PC.

Advantageously, the suitably configured electronic circuit also comprises the threshold detector and electrical noise generator circuitry. In this manner, a single circuit (e.g. an FPGA card) can provide the random number generation apparatus of the present invention. A single "plug in" random number generation card could thus be provided. Providing such a plug in random number generation card for a PC enables the PC to have simple control software which receives the random numbers output from the card. XOR operation is performed on the card which not only reduces the processing load on the host PC but reduces the amount of data that is transmitted from the card to the PC. Only the final output data needs to be communicated which reduces the data transfer requirements compared with all processing being performed by the PC. Bias control is also performed on the card. The card may be reconfigurable to different bias settings depending on the random number output required, i.e. whether the required is output a random binary sequence or a random number in the range 1-10, and the various settings stored in firmware. These settings could then be changed as required in response to a control signal from the host PC.

It should be noted that the data processing module described above, and the method employed by such a module, can be applied to the output of any random number generator. A standalone data processing module may thus be provided having the characteristics described above.

According to a further aspect of the invention, random number generation apparatus comprises a threshold detector and an electrical noise generator having at least two channels, each channel of the electrical noise generator being arranged to generate an electrical noise signal, wherein the threshold detector is arranged to periodically compare the electrical noise signal generated by each channel with a threshold and provide a binary output indicative of whether said threshold has been exceeded, characterised in that each channel of the electrical noise generator comprises amplifying means, each amplifying means providing a gain of at least 50,000. More preferably, each amplifying means imparts a gain of at least 100,000. Each amplifying means may comprise one or more amplifiers arranged in electrical series, preferably in a non-feedback (i.e. non-oscillatory) arrangement.

According to a further aspect of the invention, random number generation apparatus comprises threshold detection means and an electrical noise generator having at least one channel, wherein said at least one channel of the electrical noise generator is arranged to generate an electrical noise signal and the threshold detection means is arranged to periodically compare the electrical noise signal generated by said at least one channel with a threshold and provide a binary output indicative of whether said threshold has been exceeded, characterised in that the at least one channel of the electrical noise generator comprises amplifying means that provides a gain of at least 50,000 and in that said threshold detection means comprises a digital input/output (DIO) card. Preferably, a personal computer is also provided that is interfaced with said DIO card.

According to a further aspect of the invention, random number generation apparatus comprises a digital input/output (DIO) card. The DIO card is advantageously arranged to sample an amplified noise signal. Preferably, a personal computer is also provided that is interfaced with and/or contains said DIO card.

According to a further aspect of the invention, a method of random number generation comprises the steps of; (i) taking an electrical noise generator having at least two channels, (ii) periodically comparing the electrical noise signal generated by each channel with a threshold and providing a binary data output indicative of whether said threshold has been exceeded, characterised by the step of (i) taking an electrical noise generator having at least two channels comprising the step of taking an electrical noise generator in which each channel comprises at least two amplifiers electrically connected in series.

DESCRIPTION OF THE FIGURES

The invention will now be described, by way of example only, with reference to the following drawings in which;

FIG. 5 shows the deviation from randomness of the RNG when an XOR processing method is applied to the raw data output.

DESCRIPTION OF THE INVENTION

Figure 1:
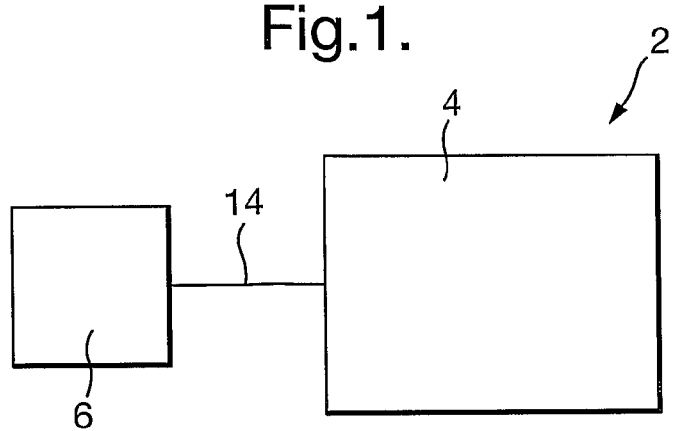
FIG. 1 illustrates a random number generator of the present invention comprising an electrical noise generation circuit and a personal computer containing a digital input/output card (DIO)

Referring to FIG. 1, a schematic illustration of a random number generator (RNG) 2 of the present invention is shown. The RNG 2 comprises an electrical noise generator circuit 6 and personal computer (PC) 4 that comprises a digital input/output (DIO) card.

The DIO card of the PC 4 is a PCI-7300A high-speed card, configured to operate in 8 bit data input mode and capable of a data transfer rate of 10 Mbytes/sec.

The RNG could also be implemented on a PCI card and connected directly to the PC.

Figure 2:
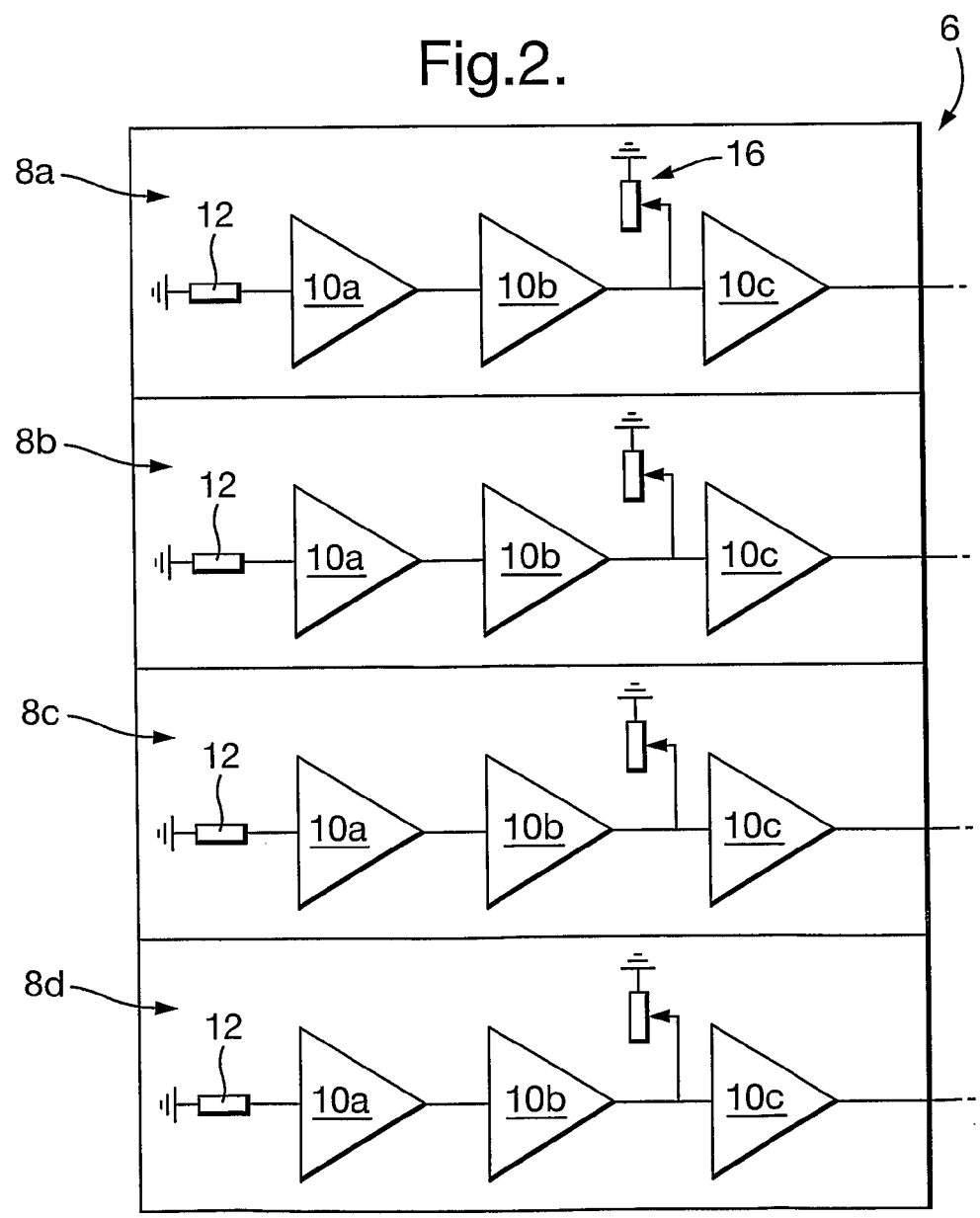
FIG. 2 illustrates the thermal noise generation circuit used to implement the electrical noise generator.

Referring to FIG. 2, the thermal noise generator circuit 6 comprises four channels (8a-8d). Each channel comprises three differential wide band amplifiers 10a-10c electrically connected in series. The wideband amplifiers are UA733 integrated circuits. The input of the first amplifier 10a is connected to a grounded resistor 12 which acts as a source of random thermal noise. Concatenating three amplifiers in this manner allowed an overall gain of approximately 100,000 to be achieved with a bandwidth of around 20 MHz. The noise present at the input of the first amplifier 10a of the chain is thus amplified so that the third amplifier 10c outputs an approximately 1V RMS output signal. The output of each channel 8 also has a DC offset of about 1V. Fine tuning of this voltage level is achieved by adjusting a potentiometer 16 which is connected to the output of the second amplifier 10b of the chain.

To avoid the positive feedback and oscillation that could occur with such a high gain amplifier system, a ground plane circuit board arrangement is used. Furthermore, each amplifier is provided with local decoupling capacitors (not shown) to reduce power supply coupling effects. To further improve electrical isolation, each amplifier channel 8 is also provided with a separate +5V and −5V regulator to convert an external +7.5V and −7.5V supply to the local supply rails. It is also ensured that the amplifier chips are physically separated from one another to maximise isolation. Preferably the power supply used is a low noise power source to reduce any coupling from the power supply.

To further reduce any possible interference effects the entire random number generator is further enclosed in an RF enclosure (EMI shield), effectively a grounded metal box. This prevents any external signal from influencing the randomness of the data and, when used for quantum cryptography application where secrecy is paramount, prevents reduces the chance of an eavesdropper from determining any information about the random numbers being produced. For a QC system all components are RF shielded including the output cables etc.

Each amplification stage also has a programmable equalisation filter (not shown) to ensure that the gain of the amplification stage is as close to a maximally flat response as possible.

The output signal generated by each of the four channels 8a-8d is fed, via a wide band buffer and a cable 14, to the input of the DIO card of the PC 4. The cable 14 is a sixteen core ribbon cable that separately connects each of the four noise outputs to four respective inputs of the DIO card. To minimise cross talk between the four channels, every fourth wire of the ribbon case carries a signal output from a channel 8 of the thermal noise generator circuit 6; all the other wires in the ribbon cable are grounded.

The DIO card of the PC 4 is arranged to convert the analogue signal output by each channel of the electrical noise generator circuit 6 to a binary logic level (i.e. "0" or "1"). The analogue signals are sampled by the DIO card at a regular rate (in this case 10 MHz) and the resulting binary data streams are transferred to the memory of the PC via a buffer.

Analysis of the random data output by the DIO card showed that, under certain circumstances, a deviation from perfect randomness may occur. Three effects were found to be noteworthy, namely; autocorrelation, cross-correlation and thermal drift.

Autocorrelation represents the tendency for a bit to be the same as (or different from) its predecessor(s). Although some degree of autocorrelation is inevitable given the finite bandwidth of the noise being sampled, an autocorrelation coefficient of less than around 1% was typically observed. Cross correlation represents the effect of crosstalk, with the value of a bit in one channel being influenced by other channels, either at the same sample time or at earlier sample times. Cross correlation can result from cross channel coupling within the thermal noise generation circuitry 6, from the cabling 14 to the DIO card, or from within the DIO card. Typically a cross correlation coefficient of around 3% was observed.

A bias in the binary data output of the DIO card was also observed; i.e. a bias toward outputting a larger proportion of "1"s or "0"s. By adjusting the potentiometer 16 in each channel 8 of the thermal noise generator circuit 6, the proportion of bits that were logical "1" could be set to be in the range 49.5% to 50.5% for each of the four channels. Although such an adjusted initially resolved the bias problem, the bias was found to be subject to slow thermal drifts. In one test run over a three day period, the bias changed by 3% while the ambient temperature changed by about 6 degrees Celcius. This effect is also apparent during the warm-up period when the system is first switched on.

Figure 3:
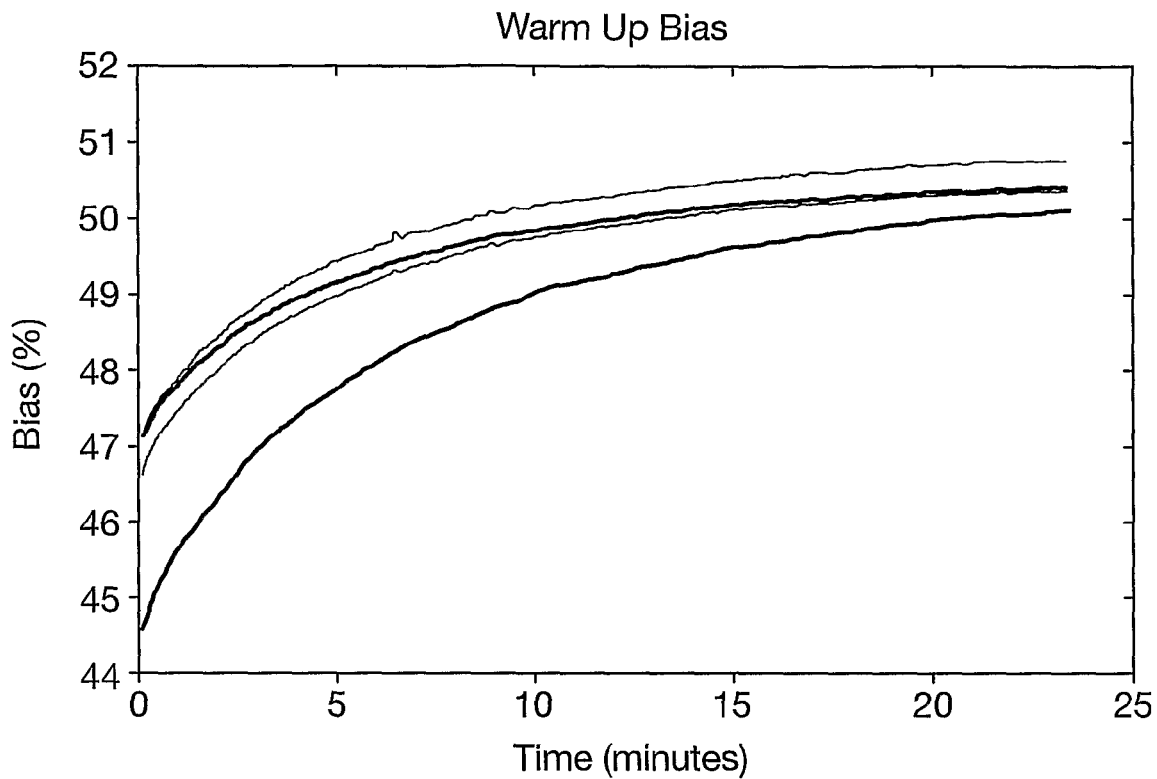
FIG. 3 shows the deviation from randomness of the RNG during warm-up.

FIG. 3 shows the bias of each of the four channels of the raw random bits as a function of time, when the RNG (i.e. the PC 4 and thermal noise generation circuit 6) has just been switched on. It is found that the largest contribution to this effect is due to the changes in the threshold of the DIO card within the PC with temperature.

It should be noted that those skilled in the art typically define the quality of a batch of random bits by the Shannon entropy. Suppose the random number generator creates a group of n bits. Then the number of possible different bit patterns is $N=2^n$, which we can number from 1 to N. Let the probability that the RNG delivers the $i^{th}$ bit pattern be $p_i$. Then the Shannon entropy of this process is defined as:

$$E = \sum_{i=1}^{N} -p_i \log_2(p_i). \tag{1}$$

For an ideal random process all bit patterns have equal probability and the entropy will be n. In other words, an ideal binary RNG has a Shannon entropy of 1.

As noted above, the bias varies with temperature hence leading to a Shannon entropy that also depends on the temperature. Under normal operation, when the temperature is within about 2° C. of the temperature at which the bias adjustment was made, a Shannon entropy of 0.999 per bit is obtained. Even with a worst case assumption that the temperature change is about 10° C., giving a bias of about 55% on all four channels, an entropy of 0.993 per bit is provided. Therefore, if such a RNG is used to generate a 256 bit key, the key will have an entropy of 256×0.993≈254 bits. In other words, a 256 bit key from the RNG will provide a level of security that is equivalent to a 254 bit key produced by a perfect random number generator.

The level of randomness noted above is acceptable for many applications. However, certain applications require a RNG having higher levels of Shannon entropy. This can be achieved by providing temperature control of the DIO card. Alternatively, the potentiometer 16 in each channel 8 of the thermal noise generator circuit 6 can be dynamically varied to minimise the bias associated with each channel. In another embodiment however the potentiometer 16 in each channel is replaced with a digital to analogue converter (DAC) responsive to an imbalance control signal generated by the computer. The DAC is a calibrated DAC having a reference voltage for good resolution.

In this embodiment the output of any channel is monitored by the computer to count the number of instances of a 1 and the number of instances of a 0. As mentioned previously for a channel with a bias of 50% the number of is produced should be equal to the number of 0s produced over time. Therefore the computer is arranged to total the number of 1s and number of 0s in a certain period. The skilled person will appreciate that the period needs to be such to allow a statistically significant number of bits to be counted. Counting for one second at a data rate of 10 Mbits per second means that a million bits are counted.

The number of 1s and 0s in this period can be compared with what should be expected for the particular bias required. For a 50% bias the numbers of 1s and 0s should be equal. The computer then processes the number of 1s and 0s to produce a number indicative of any imbalance and outputs this number to the DAC. The DAC converts this signal to an analogue DC voltage level applied to the channel. Where the particular channel is operating as required, i.e. for a 50% bias the number of 1s and 0s is equal, the imbalance control signal is maintained at the current level to keep the same level of bias. However if there are more 1s than 0s say the control signal may be increased say to increase the bias applied and restore equality. The amount of increase will be linked to the degree of imbalance detected. Similarly if there are more 0s than 1s the number output to the DAC may be lowered to reduce the bias applied and restore equality.

The counting and processing can be implemented in software and can act on the live output stream. In this way constant automatic monitoring is achieved with a feedback control to adjust for any thermal drift without interrupting the output data flow.

An exclusive or (XOR) operation is also performed on the binary random data produced by each channel. Such an operation has been found to further improve the randomness of the RNG and provide a truly random output.

Figure 4:
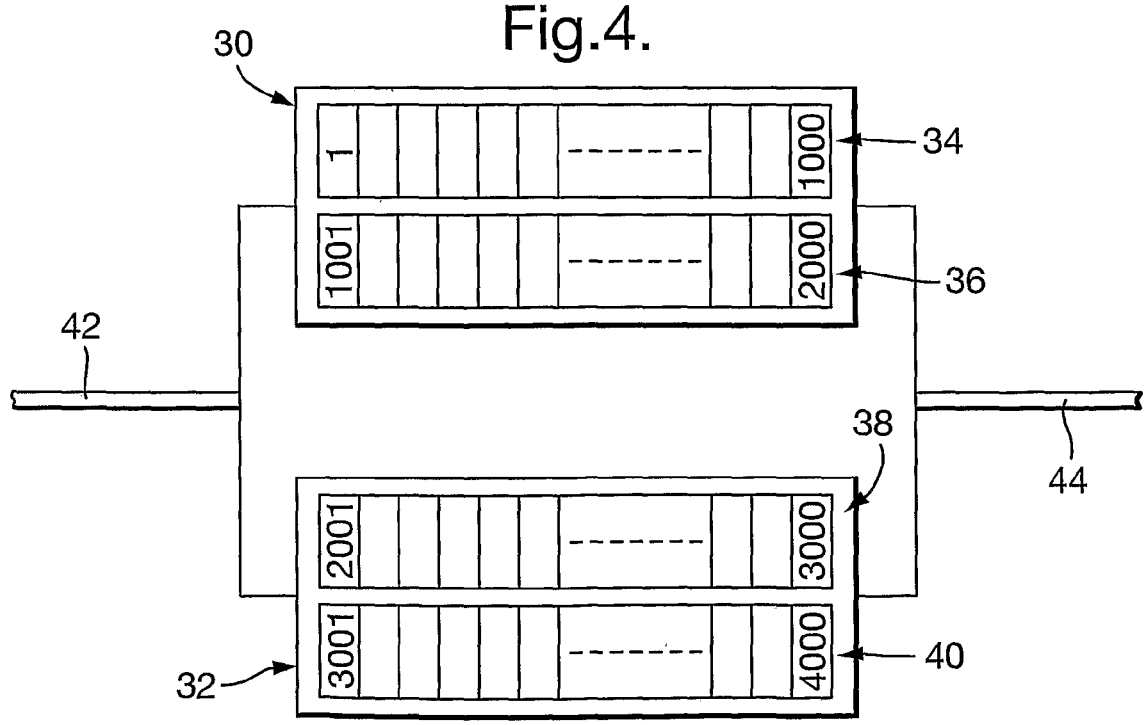
FIG. 4 illustrates the principle underlying the digital data processing of the present invention.

Referring to FIG. 4, the underlying principle of an XOR based method of improving the randomness of the data output by the DIO card of the PC 4 is illustrated. The method involves sequentially loading the random binary data stream generated by a channel of the DIO card into one of a first data buffer 30 and a second data buffer 32.

In use, the first one thousand binary data bits from the channel of the DIO card are loaded into the first segment 34 of the first data buffer 30. The second one thousand data bits are then loaded into the second segment 36 of the first data buffer 30. Once the first and second segments of the first data buffer are loaded, an exclusive or (XOR) operation is sequentially performed on corresponding data pairs of the first and second segments of the first data buffer 30. In particular, an XOR operation is performed on (i) the first data bit contained in the first segment 34 of the first data buffer 30 and (ii) the first data bit contained in the second segment 36 of the first data buffer 30. The result of the XOR calculation is output and the process is repeated in turn for pairs of values stored in the first and second segments of the first data buffer.

In parallel with the XOR operation that is performed on the data contained in the first data buffer 30, the next two thousand data bits are loaded into the first segment 38 and then the second segment 40 of the second data buffer 32. Once the second data buffer 32 is fully loaded and the XOR operation has been completed on the data in the first data buffer 30, an XOR operation is performed on data pairs contained in the first and second segments of the second data buffer 32. The first data buffer 30 is reloaded with data whilst such an XOR operation is being performed on data from the second data buffer 32.

The process of loading a buffer whilst performing an XOR operation on data loaded into the other buffer is repeated. It can thus be seen that a first stream 42 of n-bits per second is thus converted into a second stream 44. The second stream 44 has a bit rate of n/2 bits per second but, as outlined in more detail below, has improved randomness characteristics. A randomness enhancement algorithm of this type thus improves the quality of the random bits, at the expense of bit rate.

Although the above method performs the XOR operation on bits that are separated by one thousand bits, the skilled person would appreciate that a larger or smaller bit separation could be used. The separation simply needs be large enough to ensure that any local correlations in the random bit data stream output by the DIO card of the PC are removed. For example, a separation of several hundred bits or several thousand bits would also provide randomness improvement. Selection of the separation of the bits on which the XOR operation is performed simply depends on the properties of the system.

A number of alternative configurations for the XOR operation could also be employed. For example, the XOR operation could be performed on data bit pairs that are produced by different channels of the DIO card. The separation of data bits and/or the data used in the XOR operation could also be altered during operation of the system. The software could also be arranged to calculate any deviations from perfect randomness of the data output of the second stream 44 and/or the first stream 42 and to adjust the bit separation accordingly.

It should also be noted that although the technique described herein is implemented using software, a hardware implementation (e.g. using an FPGA card) could alternatively be provided. This provides a PC card solution that does not require the expenditure of host PC processing power. The concept of embedded processing, i.e. using an FPGA array and microcontroller also eases the data transmission requirements between the card and the PC. As will be understood if all the data processing was performed on the card the output would be the final random number sequence, however if the PC does the XOR operation is requires all data channels to be transferred to the PC. The implementation of embedded processing can ease a potential transmission bottleneck.

A variation of the above described processing scheme was applied to the raw data output from the DIO card of the apparatus described above with reference to FIGS. 1 and 2. The scheme operates as follows;

(i) A batch of a few tens of millions of random bits is obtained from the RNG hardware, and the batch is divided into eight equal segments (e.g. segments a, b, c, d, e, f, g, h)

(ii) Four of the eight segments are combined using an XOR operation to generate one new output segment; e.g. the operation b XOR c XOR d XOR e is performed.

(iii) Step (ii) is then repeated three more times using three different selections of four input segments (e.g. the operations a XOR c XOR d XOR f, a XOR b XOR d XOR g and a XOR b XOR c XOR h are performed).

(iv) The resulting four output segments gives half the number of bits that was originally generated, but with an improvement in quality due to the fourfold XOR process.

The above method was found to convert a 55% bias to a 50.005% bias, and a 5.7% autocorrelation or cross correlation coefficient to a 0.001% correlation coefficient. A process with a 55% bias having a Shannon entropy of 0.993 is thus converted to a process with a Shannon entropy of 0.999,999,97. Such a high level of entropy means that the RNG is practically indistinguishable from a perfect random number generator.

Referring to FIG. 5, the random data after application of the above processing method is illustrated. The graph of FIG. 5 illustrates the bias of the processed bits (averaged over all four channels) as a function of time after start up. It can be seen that the bias effects are almost completely removed; the fluctuations in the bias observed in this plot are entirely due to the statistics associated with each batch of about 800 million bits which makes up each plotted point.

The rate at which raw random bits could be generated and saved to a data file was found to be $2.64 \times 10^7$ bits per second. Although the DIO card was sampling 4 bits at a rate of $10^7$ samples per second, the overheads associated with formatting the data, transferring it to the PC memory and then writing it to the hard disk reduced the data rate to 65% of the theoretical maximum. The PC 4 is a 400 MHz Pentium II machine; tests conducted using a 1.7 GHz PC allowed a bit rate of $3.73 \times 10^7$ bits per second to be achieved. As noted above, if the XOR based compensation scheme is used the bit rate of the RNG is roughly halved. It was found that the PC 4 was able to produce essentially perfect random bits at a rate of $1.44 \times 10^7$ bits per second, whilst the 1.7 GHz PC provided a bit generation rate of $2.00 \times 10^7$ bits per second (i.e. 20 Mb/s).

A skilled person would appreciate that there exist many methods to test the randomness of a random number generator. The RNG described herein has been subjected to the tests described in the document FIPS 140-1, "Security requirements for cryptographic modules". FIPS 140-1 is an American standard published by the U.S. based National Institute of Standards and Technology. FIP 140-1 comprises a set of tests that a random number generator intended for cryptographic applications should pass.

It has been found that the output of the RNG of the present invention can pass the FIPS 140-1 tests without using the XOR processing method. However, this is when the device is fully warmed up and operating at an ambient temperature close to that at which it was last adjusted. To demonstrate a more robust behaviour, the FIPS 140-1 tests were also run on the software compensated RNG output. In short, it was found the RNG passed the test from cold and over a wide range of temperatures. The testing procedure used is described below.

To simulate the degradation in performance expected when operating the system over a wide temperature range, the bias adjustments were deliberately offset to make the probability of 1's in the raw output 55%. Then an eight Gigabit random number file was created by running the system for 20 minutes with the software compensation algorithm in use. Since the tests specified in FIPS 140 only require 20,000 bits, all the tests were repeated 400,000 times to use up all the bits in the file. The result of this was that one of the tests (the runs test) failed on one occasion, and all the other tests were passed. This outcome is expected, since in the nature of these statistical tests an ideal random number generator is expected to fail on rare occasions. The randomness of the RNG described above is thus perfect as far as these tests are concerned.

In summary, a RNG is described herein that comprises a four channel noise source which, when coupled to a DIO card, is able to generate random bits at a rate of up to 37 Mbit per second. It should be noted that the DIO card described above is capable of reading 32 bits in parallel at a rate of 10M samples per second. The provision of a random noise generation circuit having 32 channels would thus allow use of all 32 bits of the DIO card. A 32 channel system, rather than the 4 bit system described above, allows random number generation rates in excess of 100 Mbit/s.

As described above the RNG has principally been used to generate a random binary data string with an equal probability of 1s and 0s being produced. The RNG can be configured however to produce any type of random number with defined probabilities by appropriately biasing particular channels and then combining the data from various channels. For instance the RNG could be configured to produce any one of N numbers with equal probability. Imagine the RNG is used to generate a number between 1 and 10 with equal probability. To produce the number the output from four channels may be combined to produce a four digit binary number. Thus the binary numbers from 0000 to 1111 could be generated, i.e. 0 to 15, by the combined output. As only the numbers 1 to 10 are required the processing software would look to discard any numbers that fell outside of this range, i.e. it would discard the number 0000, or any of the numbers 1011-1111. Thus the acceptable numbers would be 0001, 0010, 0011, 0100, 0101, 0110, 0111, 1000, 1001, 1010. It can be seen that if each of these numbers are equally likely then the probability of the least significant bit being a 1 is the same as it being a 0, i.e. 50%. Therefore the bias for the channel which generates the output corresponding to the least significant bit is set at 50%. The same is true for the second least significant bit. However were each number to be equally likely then the most significant bit should be a 0 seven times out of ten and the next most significant bit six times out of ten. Therefore the bias for these channels are set to be 70% and 60% respectively towards producing a zero. In this way the computer adjusts the bias of each channel independently and maintains it at the correct bias. It also combines the output of the various channels in the correct manner to produce the required output.

The invention claimed is:

1. Random number generation apparatus comprising:
an electrical noise generator having at least two channels, each channel of the electrical noise generator being arranged to generate an electrical noise signal and each channel comprising at least two amplifiers electrically connected in series, wherein the two amplifiers of one of the at least two channels is separate from the two amplifiers of the other of the at least two channels,
a threshold detector, wherein the threshold detector is arranged to periodically compare the electrical noise signal generated by each channel with a predetermined threshold voltage to provide a binary data output stream, wherein the binary data output stream is indicative of whether said threshold has been exceeded for each channel,
a feedback reduction means in each channel of the electrical noise generator to minimize feedback through the series of the at least two amplifiers, and
a data processing module, the data processing module comprising at least one input data buffer for each channel of the electrical noise generator, and the at least one input data buffer is configured to receive binary data output stream from the threshold detector to perform a processing step on the received binary data output stream to generate a processed binary data output, wherein each input data buffer is divided into at least first and second segments, and each segment is fully loaded with binary data bits of the received binary data output stream, and wherein the processing step comprises performing at least one XOR operation on pairs of binary data bits, each pair of binary data bits comprising a data bit from the first segment and a data bit from the second segment.

2. An apparatus according to claim 1 wherein the at least two amplifiers of each channel of the electrical noise generator are arranged to provide an overall gain in the range of 50,000 to 150,000.

3. An apparatus according to claim 1 wherein each of the at least two amplifiers of each channel have a bandwidth within the range of 10 MHz to 100 MHz.

4. An apparatus according to claim 1 wherein each channel comprises three amplifiers connected in series.

5. An apparatus according to claim 1 wherein each channel comprises an equalisation filter.

6. An apparatus according to claim 1 wherein each channel comprises at least one bias control means, the at least one bias control means being connected to an input of one of said at least two amplifiers and arranged so as to provide control over the DC voltage level of the electrical noise signal output by the channel.

7. An apparatus according to claim 6 and further comprising a drift compensation controller for adjusting the at least one bias control means of each channel so as to maintain the bias of the binary data output of the threshold detector to within a predetermined range.

8. An apparatus according to claim 1 wherein each channel comprises a load resistor, the load resistor being connected to the input of the first amplifier of the series of at least two amplifiers.

9. An apparatus according to claim 1 wherein the threshold detector produces a separate binary data output stream for each electrical noise signal.

10. An apparatus according to claim 9 in which the threshold detector comprises a digital input/output (DIO) card having a plurality of inputs, wherein the electrical noise signal generated by each channel of the electrical noise generator is provided to a separate input of the DIO card.

11. An apparatus according to claim 1 wherein each electrical noise signal is sampled by the threshold detector at a rate within the range of 5 MHz to 15 MHz.

12. An apparatus according to claim 1, in which the data bits of each pair are derived by the threshold detector from the electrical noise signal of the same channel.

13. An apparatus according to claim 1 wherein, each input data buffer is arranged to receive the binary data output generated by the threshold detector from the electrical noise signal of the respective channel of the electrical noise generator.

14. An apparatus according to claim 1 wherein each input data buffer comprises at least first, second, third and fourth segments, wherein said at least one XOR operation is performed on data contained in the first and second segments whilst the third and fourth segments are being loaded with binary data.

15. Random number generation apparatus comprising:
an electrical noise generator having at least two channels, each channel of the electrical noise generator being arranged to generate an electrical noise signal wherein each channel of the electrical noise generator comprises amplifying means wherein the amplifying means of one of the at least two channels is separate from the amplifying means of the other of the at least two channels and wherein each of the amplifying means providing a gain of at least 50,000;
threshold detector means wherein the threshold detector is arranged to periodically compare the electrical noise signal generated by each channel with a predetermined threshold voltage and provide a binary data output stream wherein the binary data output stream is indicative of whether said threshold has been exceeded for each channel, and wherein said threshold detection means comprise a digital input/output (DIO) card;
a feedback reduction means in each channel of the electrical noise generator to minimize feedback through the series of the at least two amplifiers; and
a data processing module, the data processing module comprising at least one input data buffer for each channel of the electrical noise generator, and the at least one input data buffer is configured to receive binary data output stream from the threshold detector to perform a processing step on the received binary data output stream to generate a processed binary data output, wherein each input data buffer is divided into at least first and second segments, and each segment is fully loaded with binary data bits of the received binary data output stream, and wherein the processing step comprises performing at least one XOR operation on pairs of binary data bits, each pair of binary data bits comprising a data bit from the first segment and a data bit from the second segment.

16. A method of random number generation:
using an apparatus including an electrical noise generator having at least two channels, each channel of the electrical noise generator being arranged to generate an electrical noise signal and each channel comprising at least two amplifiers electrically connected in series, wherein the two amplifiers of one of the at least two channels is separate from the two amplifiers of the other of the at least two channels; a feedback reduction means in each channel of the electrical noise generator to minimize feedback through the series of the at least two amplifiers; and a data processing module, the data processing module comprising at least one input data buffer for each channel of the electrical noise generator wherein the at least one input data buffer is configured to receive binary data output stream from the threshold detector; the method comprising the steps of:
periodically comparing the electrical noise signal generated by each channel of the electrical noise generator with a predetermined threshold and providing a binary data output stream indicative of whether said threshold has been exceeded for each channel; and processing the received binary data output stream to generate a processed binary data output, wherein each input data buffer is divided into at least first and second segments, and each segment is fully loaded with binary data bits of the received binary data output stream, and wherein the processing step comprises performing at least one XOR operation on pairs of binary data bits, each pair of binary data bits comprising a data bit from the first segment and a data bit from the second segment.

* * * * *